US008149347B2

(12) United States Patent
Yang

(10) Patent No.: US 8,149,347 B2
(45) Date of Patent: Apr. 3, 2012

(54) THIN FILM TRANSISTOR SUBSTRATE AND METHOD OF MANUFACTURING THE SAME

(75) Inventor: Joon Young Yang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/021,228

(22) Filed: Feb. 4, 2011

(65) Prior Publication Data

US 2011/0143504 A1 Jun. 16, 2011

Related U.S. Application Data

(62) Division of application No. 11/797,582, filed on May 4, 2007, now Pat. No. 7,903,188.

(30) Foreign Application Priority Data

Dec. 27, 2006 (KR) ........................ 10-2006-0135467

(51) Int. Cl.
*G02F 1/1368* (2006.01)
(52) U.S. Cl. ............................................ 349/43; 216/13
(58) Field of Classification Search .................... None
See application file for complete search history.

(56) References Cited

U.S. PATENT DOCUMENTS

| 5,352,907 | A  | * | 10/1994 | Matsuda et al. ............... 257/59 |
| 5,407,845 | A  |   | 4/1995  | Nasu et al. |
| 5,483,082 | A  | * | 1/1996  | Takizawa et al. ............... 257/59 |
| 5,621,556 | A  | * | 4/1997  | Fulks et al. .................... 349/42 |
| 6,388,726 | B1 | * | 5/2002  | Kim et al. ..................... 349/141 |
| 7,807,486 | B2 | * | 10/2010 | Kwack ........................... 438/30 |
| 2003/0017636 | A1 |  | 1/2003 | Lay et al. |
| 2005/0157236 | A1 |  | 7/2005 | Kawasaki |
| 2005/0185109 | A1 | * | 8/2005 | Rho et al. ........................ 349/44 |
| 2005/0212986 | A1 | * | 9/2005 | Kawasaki ....................... 349/43 |
| 2005/0285195 | A1 |   | 12/2005 | Choi et al. |
| 2007/0042537 | A1 | * | 2/2007 | Lee ............................... 438/158 |
| 2007/0154845 | A1 | * | 7/2007 | Shin et al. .................... 430/311 |
| 2007/0246707 | A1 |   | 10/2007 | Deng et al. |
| 2008/0001154 | A1 | * | 1/2008 | Lee ................................ 257/59 |
| 2008/0002125 | A1 |   | 1/2008 | Kim |
| 2008/0003726 | A1 | * | 1/2008 | Park ............................. 438/149 |

* cited by examiner

*Primary Examiner* — Mike Stahl
(74) *Attorney, Agent, or Firm* — Morgan, Lewis & Bockius LLP

(57) ABSTRACT

A method of fabricating a liquid crystal display device includes forming a gate electrode; forming a gate insulator on the gate electrode, an active layer on the gate insulator, and an etch stopper on the active layer; depositing an ohmic contact layer, a first metal layer and a second metal layer on the substrate; etching the ohmic contact layer, and the first and second metal layers to form ohmic contact patterns, and first and second metal patterns including source, drain and pixel electrodes using a single photomask.

11 Claims, 10 Drawing Sheets

THIN FILM TRANSISTOR SUBSTRATE AND METHOD OF MANUFACTURING THE SAME

This is a divisional application of application Ser. No. 11/797,582, filed on May 4, 2007, now U.S. Pat. No. 7,903,188, which claims priority to Korean patent application number 10-2006-0135467 filed Dec. 27, 2006, all of which are hereby incorporated by reference.

BACKGROUND

1. Field of the Invention

Embodiments of the present invention relate to a flat panel display, and more particularly, to a thin film transistor substrate for a flat panel display and a method of manufacturing the same.

2. Description of the Related Art

Flat panel displays such as liquid crystal displays (LCDs) and organic light emitting displays (OLEDs) include a thin film transistor substrate, on which a thin film transistor functioning as a switching device is formed, for active matrix driving. The liquid crystal display generally displays an image using electrooptic characteristics of liquid crystal molecules in a liquid crystal layer.

The liquid crystal display includes a color filter substrate and a thin film transistor substrate which face each other with the liquid crystal layer sandwiched therebetween. The color filter substrate allows an image displayed on a liquid crystal panel to have color. The thin film transistor substrate includes a thin film transistor functioning as a switching device, thereby applying a data voltage provided by a driving circuit to the liquid crystal layer.

The thin film transistor includes an ohmic contact layer, a gate electrode, a source electrode, a drain electrode, and an active layer, and the active layer forms a channel of the thin film transistor. The thin film transistor is typically manufactured using a 5-photomask process. However, the manufacturing cost of the thin film transistor is high due to the use of a 5-photomask process. Accordingly, a 4-photomask process is used to reduce the manufacturing cost.

The 4-photomask process includes a first photomask process for forming the gate electrode and a gate line, a second photomask process for forming a gate insulating layer, an ohmic contact pattern, the active layer, the source electrode, the drain electrode, and a data line, a third photomask process for forming a contact hole exposing portions of a passivation layer and the drain electrode, and a fourth photomask process for forming a pixel electrode. However, in a case of using the 4-photomask process, since the active layer, the source electrode, the drain electrode, and the data line are simultaneously formed using one partial exposure mask, the active layer underlying the data line protrudes from the data line. This results in the occurrence of a wavy noise. The wavy noise is caused by interference generated between the active layer and the pixel electrode when leakage current in the active layer occurs due to light form a backlight unit. The wavy noise generates moiré fringe on an image displayed on the liquid crystal panel, thereby reducing the display quality of the liquid crystal display.

When the active layer, the source electrode, the drain electrode, and the data line are formed using one partial exposure mask in the four photomask process, the active layer can be over-etched such that the active layer may be formed in a back channel structure. Accordingly, the active layer needs to be thick to secure a margin for an etching process of the active layer such that the characteristics (for example, mobility and sub-threshold) of the thin film transistor are not negatively affected. A method for forming an etch stopper on the active layer can be used to prevent such problems. However, a separate photomask process for forming the etch stopper is added such that there is again the problem of a complicated five photomask process, which increases manufacturing cost of the thin film transistor substrate.

SUMMARY OF THE INVENTION

Accordingly, embodiments of the invention is directed to a thin film transistor substrate for a flat panel display device and a method of manufacturing the same that substantially obviate one or more of the problems due to limitations and disadvantages of the related art.

An object of embodiments of the invention is to reduce a manufacturing cost and time of a flat panel display device having a thin film transistor.

Another object of embodiments of the invention is to prevent an over-etching during manufacturing of a thin film transistor in a flat panel display device.

Another object of embodiments of the invention is to protecting the electrical characteristics of a thin film transistor in a flat panel display device.

Another object of embodiments of the invention is to reduce a wavy noise and improve the visual quality of a flat panel display device.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a substrate; a gate electrode on the substrate; a gate insulator on the gate electrode; an active layer on the gate insulator; an etch stopper on the active layer; ohmic contact patterns spaced apart from each other contacting the active layer and portions of the etch stopper; source and drain electrodes on the ohmic contact patterns, each of the source and drain electrodes including a first metal pattern contacting the ohmic contact patterns and a second metal pattern contacting the first metal pattern; and a pixel electrode extending from the first metal pattern to include substantially the same material as the first metal pattern.

In another aspect, a method of fabricating a liquid crystal display device includes forming a gate electrode; forming a gate insulator on the gate electrode, an active layer on the gate insulator, and an etch stopper on the active layer; depositing an ohmic contact layer, a first metal layer and a second metal layer on the substrate; etching the ohmic contact layer, and the first and second metal layers to form ohmic contact patterns, and first and second metal patterns including source, drain and pixel electrodes using a single photomask.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are comprised to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
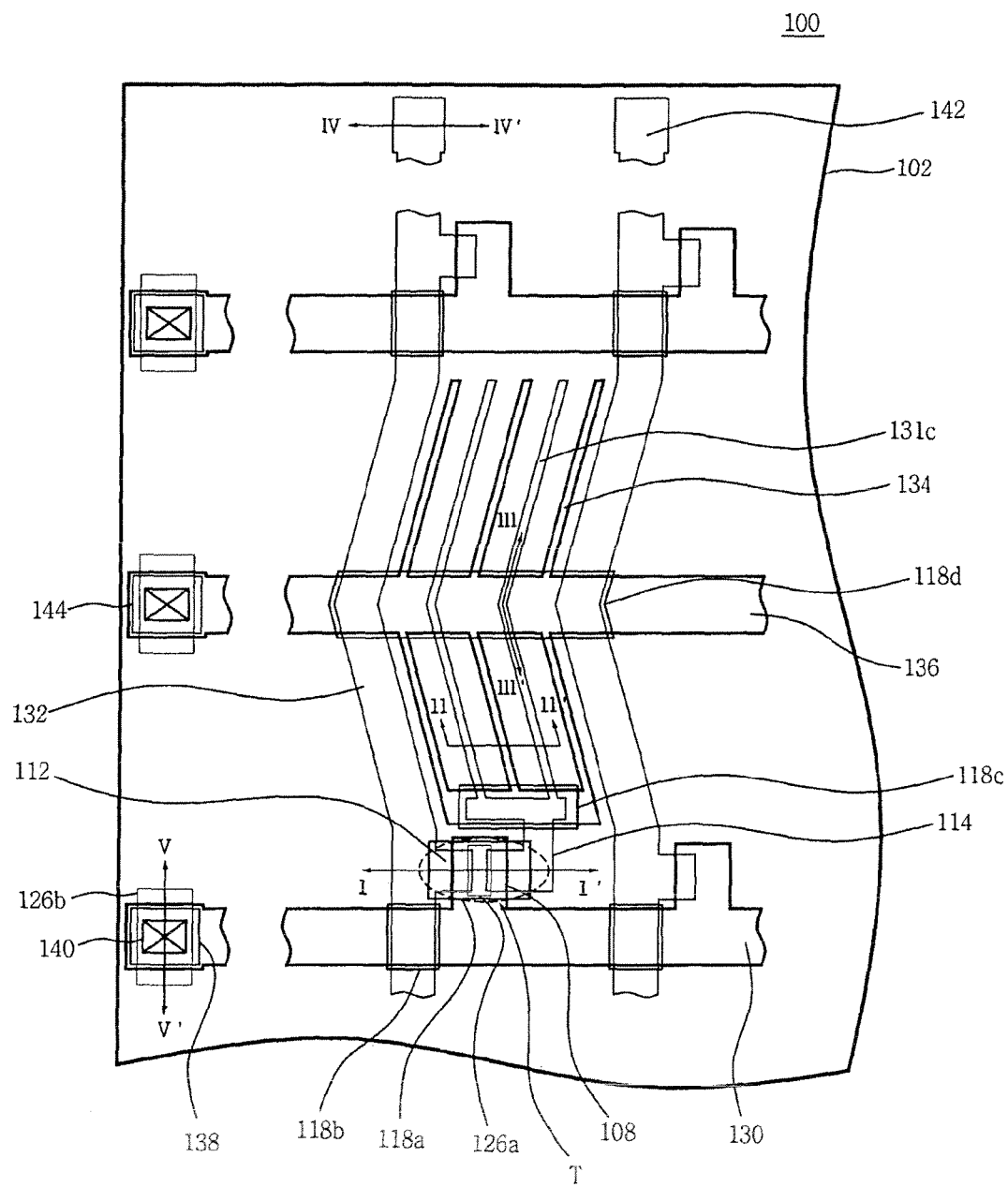
FIG. 1 is a plane view of a thin film transistor substrate according to a first embodiment.
Figure 2:
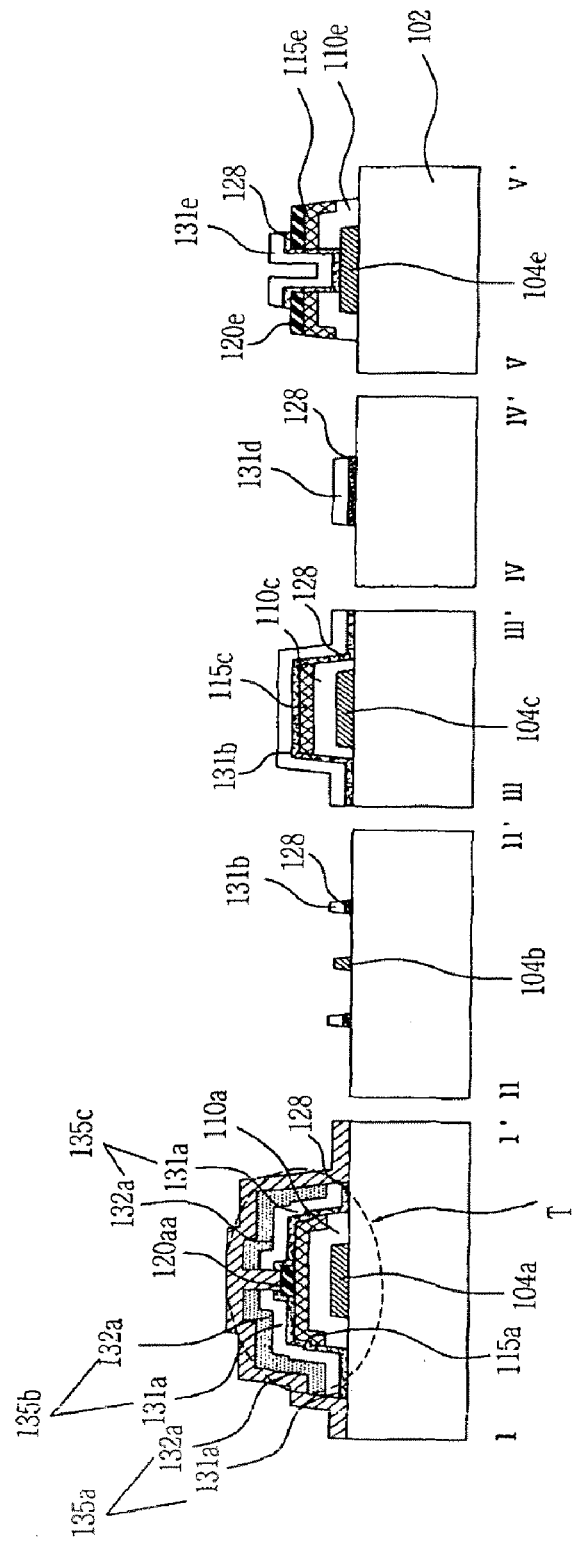
FIG. 2 is a cross-sectional view taken along lines I-I', II-II', III-III', IV-IV', and V-V' of FIG. 1.

FIG. 1 is a plane view of a thin film transistor substrate according to a first embodiment. FIG. 2 is a cross-sectional view taken along lines I-I', II-II', III-III', IV-IV', and V-V' of FIG. 1. Referring to FIGS. 1 and 2, a flat panel display, such as a liquid crystal display or an organic light emitting device, can include a thin film transistor substrate 100 according to the first embodiment. For instance, in the case where the liquid crystal display includes the thin film transistor substrate 100, the thin film transistor substrate 100 applies a driving voltage (for example, a data voltage and a common voltage) supplied from a driving circuit of the liquid crystal display to a liquid crystal layer of the liquid crystal display.

The thin film transistor substrate 100 includes a thin film transistor (T) with an etch stopper 120aa. The substrate 102 can be a transparent material, such as glass or plastic, or an opaque material, such as stainless steel. The thin film transistor substrate 100 also includes a gate line 104e crossing a data line 135a, and a common electrode line 104c parallel to the gate line 104 and also crossing the data line 135a. A common electrode 104b is connected to the common electrode line 104c. The pixel electrode 131b electrically connected to the thin film alternates with the common electrode 104b. A gate pad electrode 131e at an end of the gate one 104e, a data pad electrode 131d at an end of the data line 135a, and a common pad electrode 144 at an end of the common electrode line 104s are also positioned on the substrate 102.

The thin film transistor (T) is adjacent to where the gate line 104e and the data line 135a cross each other, and functions as a switching device for active matrix driving. The thin film transistor (T) includes a gate electrode 104a on the substrate 102, a gate insulator 110a on the gate electrode, an active layer 115a on the gate insulator 110a, ohmic contact patterns 128 on the active layer 115a, a source electrode 135b on one of the ohmic contact patterns 128, and a drain electrode 135c on the other one of the ohmic contact patterns 128.

The ohmic contact patterns 128 forms an ohmic contact between the source electrode 135b and the active layer 115a, and an ohmic contact between the drain electrode 135c and the active layer 115a. The ohmic contact pattern 128 can include heavily doped n+ type amorphous silicon, but it is not limited thereto. The thickness of the ohmic contact patterns 128 may be within a range of about 50 Å to about 500 Å, but it is not limited thereto. The ohmic contact patterns 128 are on and overlap the etch stopper 120aa. Further, the ohmic contact patterns 128 are on sidewalls of the gate insulator 110a, which has an island shape.

The gate electrode 104a turns on and off the thin film transistor (T) using a gate voltage from the gate line 104e. The gate electrode 104a is connected to the gate line 104e. The gate electrode 104a may be formed in a single layered structure or a multiple layered structure including a metal material, such as Cr or Cr alloy, Al or Al alloy, Mo or Mo alloy, Ag or Ag alloy, Cu or Cu alloy, Ti or Ti alloy, and Ta or Ta alloy. The thickness of the gate electrode 104a is within range of about 1,000 Å to about 5,000 Å, but it is not limited thereto.

The source electrode 135b is connected to the data line 135a. The source electrode 135b overlaps the gate electrode 104a with a gate insulator 110a being sandwiched therebetween. The source electrode 135b overlaps the active layer 115a and the etch stopper 120aa with the ohmic contact pattern 128 being sandwiched therebetween. When the gate electrode 104a turns on the thin film transistor (T), the source electrode 135b supplies a data voltage from the data line 135a to the drain electrode 135c via the active layer 115a.

The source electrode 135b may be formed of a multi-layered pattern comprising a metal material, such as Cr or Cr alloy, Al or Al alloy, Mo or Mo alloy, Ag or Ag alloy, Cu or Cu alloy, Ti or Ti alloy, Ta or Ta alloy, indium-tin-oxide (ITO), $In_2O_3$—ZnO (IZO), and $In_2O_3$—ZnO—SnO (IZTO). The source electrode 135b and the drain electrode 135c are formed of a multi-layered pattern obtained by stacking a first metal pattern 131a and a second metal pattern 132a. The drain electrode 135c and the source electrode 135b are formed of the same material on the same plane so that the drain electrode 135c has the same stack structure as the source electrode 135b. The first metal pattern 131a of the source electrode 135b may be formed of Mo with a specific resistance characteristic on which a dry etching process can be performed. Since the source electrode 135b and the data line 135a can be formed of the same material on the same plane, the source electrode 135b needs to be slightly thick. The thickness of the first metal pattern 131a of the source electrode 135b is within a range of about 1,000 Å to about 3,000 Å, but it is not limited thereto.

The drain electrode 135c is opposite to the source electrode 135b. The drain electrode 135c supplies a data voltage from the source electrode 135b to the pixel electrode 131b connected to the drain electrode 135c via the active layer 115a. The pixel electrode 131b is made of the same material as the first metal pattern 131a of the drain electrode 135c. The pixel electrode 131b and the first metal pattern 131a of the drain electrode 135c can be integrally formed. The drain electrode 135c overlaps the gate electrode 104a with the gate insulator 110a sandwiched therebetween. The drain electrode 135c overlaps the active layer 115a and the etch stopper 120aa with the ohmic contact pattern 128 being sandwiched therebetween.

The active layer 115a forms a passage (i.e., a channel of the thin film transistor (T)) for supplying the data voltage from the source electrode 135b to the drain electrode 135c. The active layer 115a can include amorphous silicon, but it is not limited thereto. The thickness of the active layer 115a is within a range of about 200 Å to about 2,000 Å, but it is not limited thereto. The active layer 115a overlaps the gate electrode 104a with the gate insulator 110a being sandwiched therebetween.

Since the active layer 115a forms the channel of the thin film transistor (T), a characteristic of an interface between the gate insulator 110a and the active layer 115a can be important. The gate insulator 110a can be formed of opaque $SiN_x$, or $SiO_x$. The thickness of the gate insulator 110a can be in a range of about 2,000 Å to about 5,000 Å, but it is not limited thereto. The active layer 115a is formed in an island shape that is same as the island shape of the gate insulator 110a or at least shielded by the gate insulator 110a. The active layer 115a may be manufactured without using the photomask process used to form the data line 135a. Accordingly, a wavy noise generated when the active layer 115a and the data line 135a are patterned using the same photomask is prevented such that the display quality of the liquid crystal display 100 improves.

The etch stopper 120aa is positioned over the active layer 115a, and protects a channel, which the active layer 115a forms. The etch stopper 120aa may be formed of one of SiNx and SiOx. The thickness of the etch stopper 120aa can be in a range of about 200 Å to about 2,000 Å, but it is not limited thereto. The active layer 115a can be used as a mask for patterning the gate insulator 110a. Therefore, the gate insulator 110a can be formed in the same island shape as the active layer 115a. Because the gate insulator 110a can be formed using the active layer 115a as a mask, the thin film transistor substrate 100 is manufactured through simpler manufacturing processes and at lower cost. Since the etch stopper 120aa prevents over-etching of the active layer 115a when subsequently forming the source electrode 135b and the drain electrode 135c, the active layer 115a can not be formed to be too thin. Therefore, the electrical characteristics of the thin film transistor (T) are protected and maintained.

The pixel electrode 131b receives the data voltage supplied from the source electrode 135b to the drain electrode 135c via the active layer 115a. As described above, in the case where the liquid crystal display includes the thin film transistor substrate 100, the pixel electrode 131b may apply the data voltage to the liquid crystal layer of the liquid crystal display. The pixel electrode 131b may be formed in a chevron form, but it is not limited thereto. The pixel electrode 131b is connected to the drain electrode 135c to receive the data voltage. The pixel electrode 131b is formed of the same material as the first metal pattern 131a of the drain electrode 135c using the same photomask process as the first metal pattern 131a.

The gate line 104e supplies a gate voltage from the gate pad electrode 131e to the gate electrode 104a. The gate line 104e is connected to the gate pad electrode 131e and the gate electrode 104a. The gate line 104e and the gate electrode 104a are formed of the same material and on the same plane so that the gate line 104e has the same stack structure as the gate electrode 104a.

The data line 135a supplies the data voltage from the data pad electrode 131d to a data electrode. The data line 135a is connected to the data pad electrode 131d and the source electrode 135b. The data line 135a is formed of the same material as the source electrode 135b and the drain electrode 135c and on the same plane as the source electrode 135b and the drain electrode 135c so that the data line 135a has the same stack structure as the source electrode 135b and the drain electrode 135c.

Since the data line 135a is formed to cross the gate line 104e, a first silicon pattern 115b and a gate insulating pattern (not shown in FIG. 1) are formed where the data line 135a and the gate line 104e cross to prevent a short circuit between the data line 135a and the gate line 104e. In other words, the data line 135a overlaps and crosses the gate line 104e with the gate insulating pattern being sandwiched therebetween. Because the gate insulating pattern is patterned with a first silicon pattern 115b like the gate insulator 110a is patterned with the active layer 115a, the first silicon pattern 115b and the active layer 115a have the same material and are on the same plane.

The common electrode 104b and the common electrode line 104c are formed of the same material as the gate electrode 104a and on the same plane as the gate electrode 104a so that the common electrode 104b and the common electrode line 104c have the same stack structure as the gate electrode 104a.

The common electrode line 104c supplies a common voltage to the common electrode 104b so that the common electrode 104b and the pixel electrode 131b form a horizontal electric field. The common voltage may be supplied from the common pad electrode 144 to the common electrode line 104c.

The common electrode 104b and the pixel electrode 131b form a horizontal electric field. The common electrode 104b is connected to the common electrode line 104c by extending from the common electrode line 104c such that the common electrode 104b is formed in parallel to the pixel electrode 131b. A third silicon pattern 115d and a gate insulating pattern (not shown) is formed to prevent a short between the common electrode line 104c and the pixel electrode 131b. In other words, the common electrode line 104c and the pixel electrode 131b overlap each other with the third silicon pattern 115d and the gate insulating pattern being sandwiched therebetween. Because the gate insulating pattern is patterned with the third silicon pattern 115d in a manner similar to the gate insulator 110a which is patterned with the active layer 115a, the third silicon pattern 115d and the active layer 115a have the same material and are on the same plane. In this case, the pixel electrode 131b, the common electrode line 104c, the third silicon pattern 115d, and the gate insulating layer underlying the third silicon pattern 115d form a storage capacitor.

The gate pad electrode 131e is connected to the gate line 104e through a contact hole 125, and supplies the gate voltage to the gate line 104e. A fourth silicon pattern 115e and an etch stop residual pattern 120e are stacked on the gate pad electrode 131e in this order to form the contact hole 125. The fourth silicon pattern 115e and the active layer 115a are formed of the same material and on the same plane. The etch stopper pattern 120b and the etch stopper 120aa are formed of the same material and on the same plane. The ohmic contact pattern 128 is formed between the gate pad electrode 131e and the gate line 104e.

The data pad electrode 131d is connected to the data line 135a, and supplies the data voltage to the data line 135a. The ohmic contact pattern 128 underlies the data pad electrode 131d.

The common pad electrode 144 is connected to the common electrode line 104c, and supplies the common voltage to the common electrode line 104c.

The gate pad electrode 131e, the data pad electrode 131d, and the common pad electrode 144 each are formed of the same material as the pixel electrode 131b and on the same plane as the pixel electrode 131b so that the gate pad electrode 131e, the data pad electrode 131d, and the common pad electrode 144 each have the same stack structure as the pixel electrode 131b.

Figure 3A:
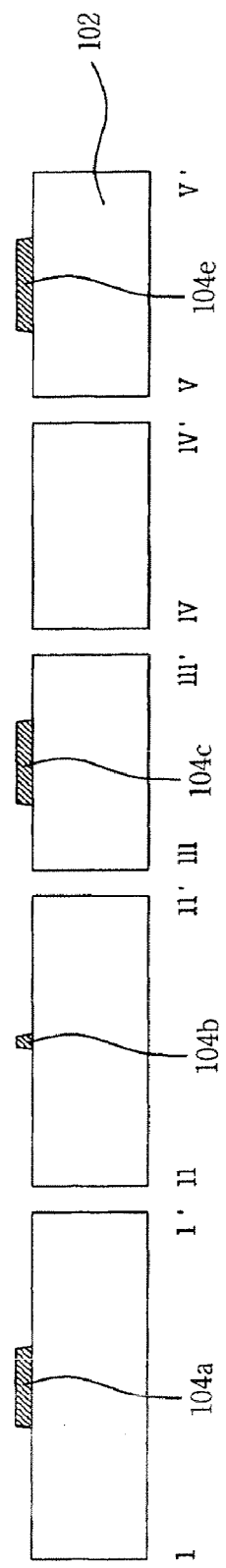
FIGS. 3A to 3G are cross-sectional views depicting a method of manufacturing the thin film transistor substrate according to the first embodiment.
Figure 3B:
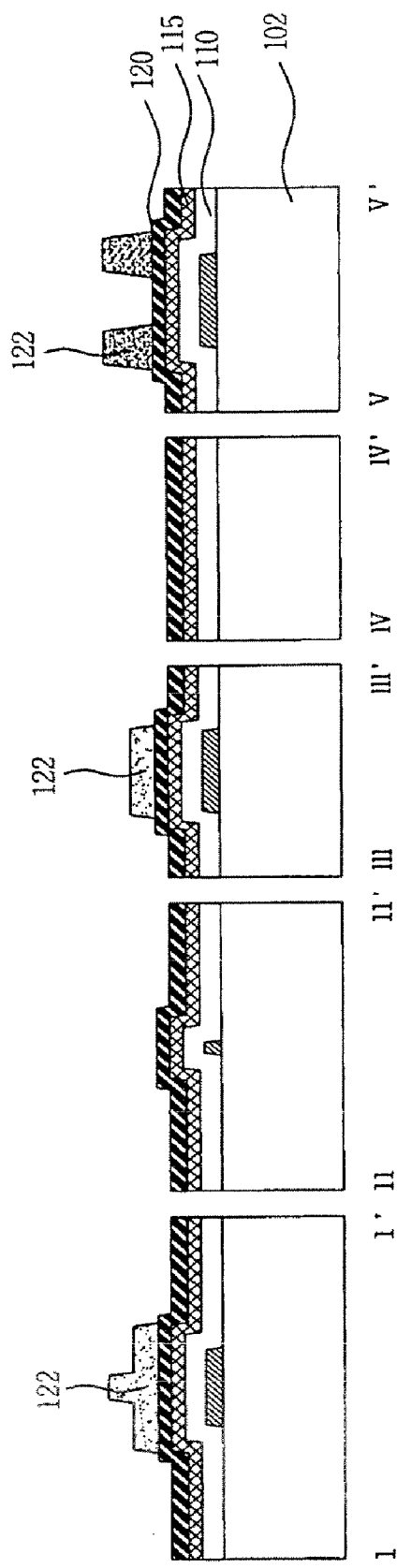
Figure 3C:
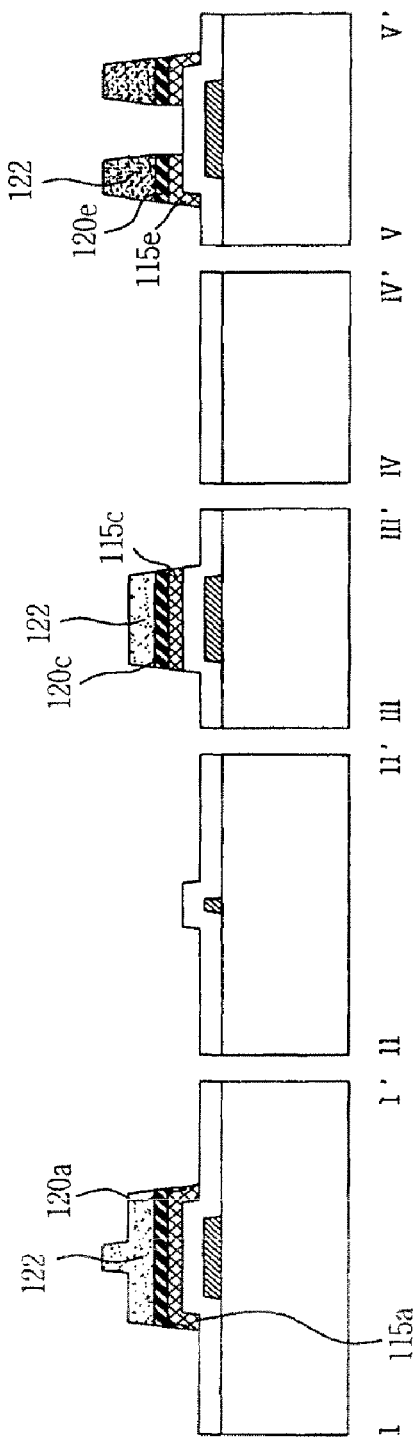
Figure 3D:
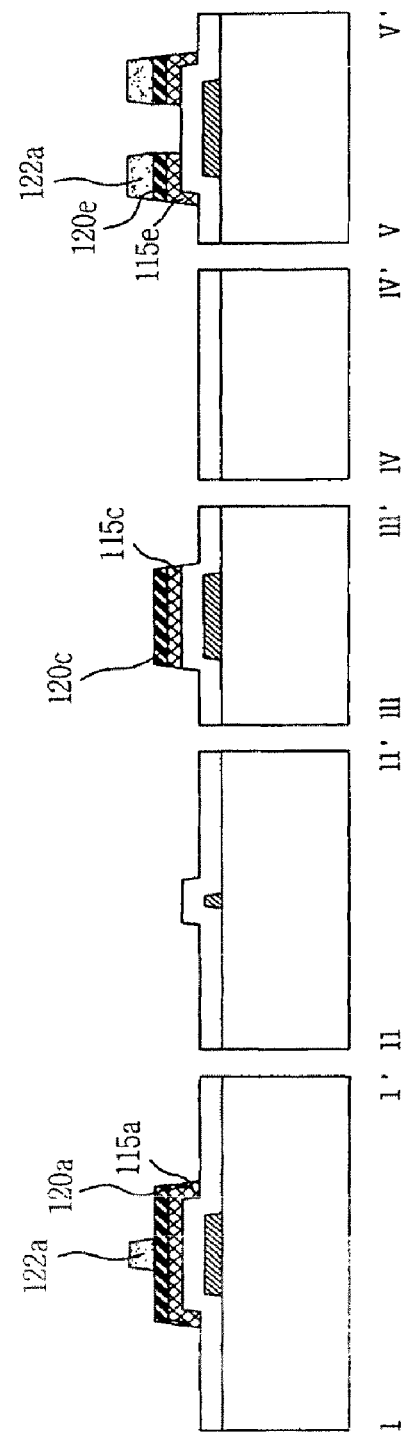
Figure 3E:
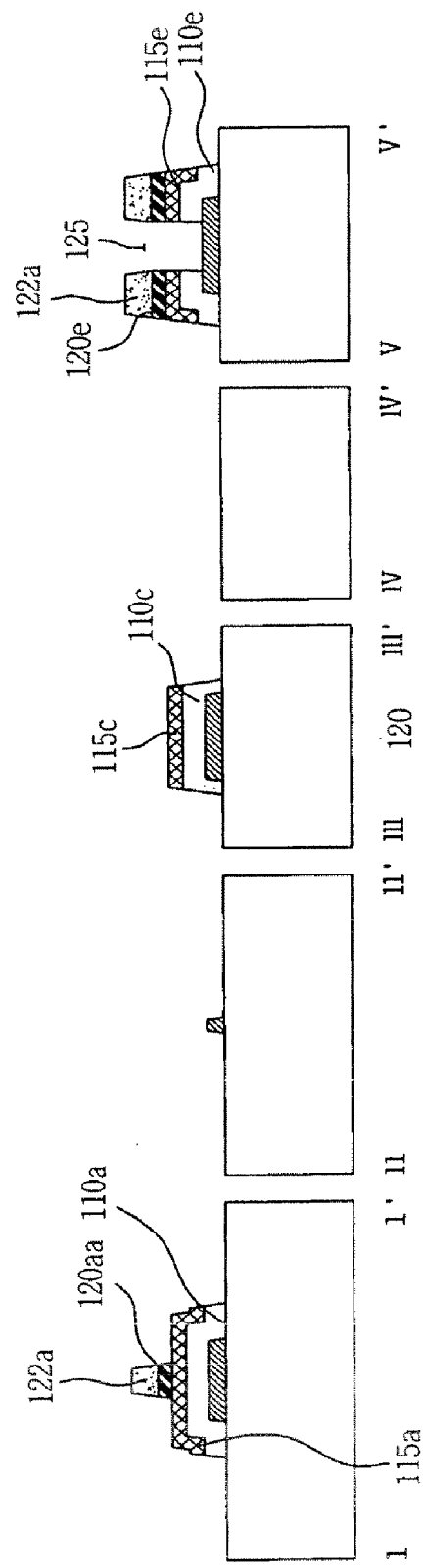
Figure 3F:
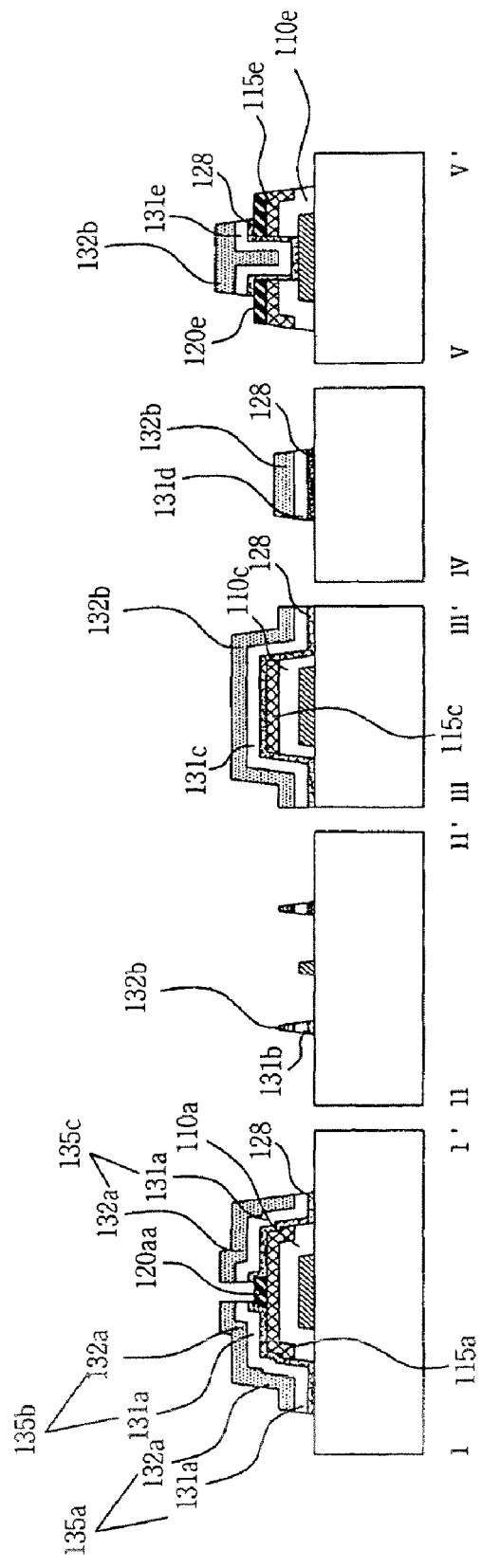
Figure 3G:
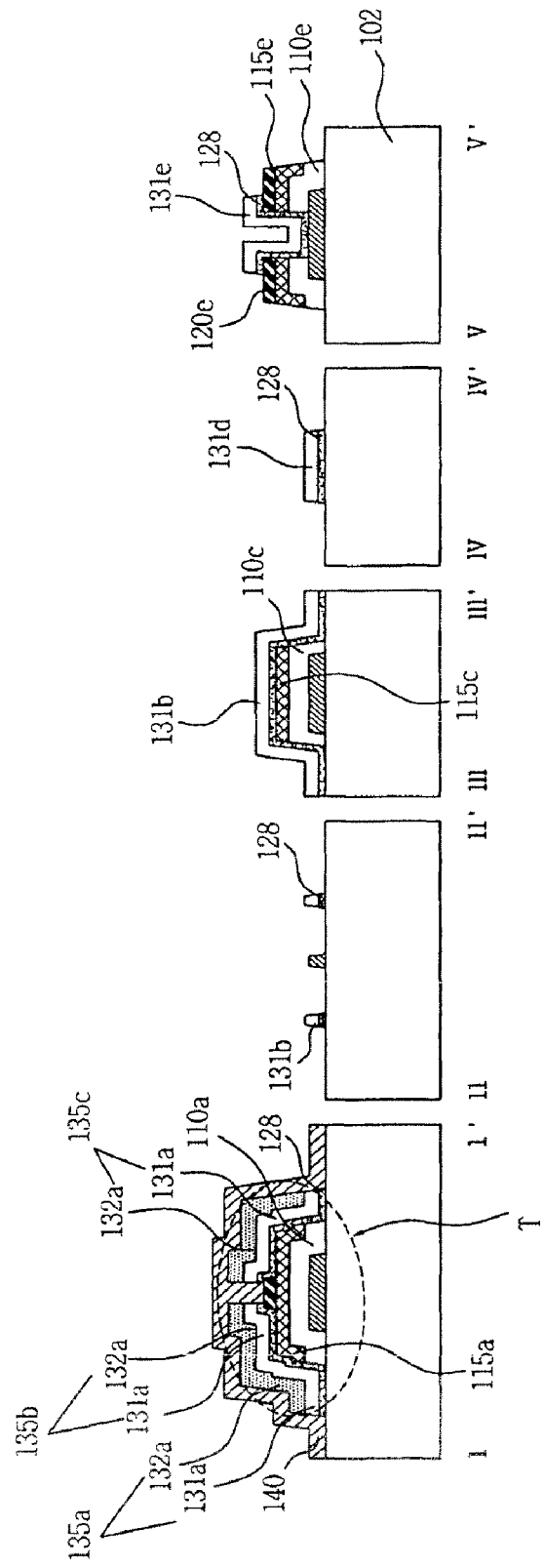

FIGS. 3A to 3G are cross-sectional views depicting a method of manufacturing the thin film transistor substrate according to the first embodiment. FIG. 3A is a cross-sectional view depicting a first photomask process, FIGS. 3B to 3E are cross-sectional views depicting a second photomask process, FIG. 3F is a cross-sectional view depicting a third photomask process, and FIG. 3G is a cross-sectional view depicting a fourth photomask process.

As shown in FIG. 3A, a gate metal layer is deposited on the substrate 102. More specifically, a gate metal layer of a single layered structure or a multiple layered structure is formed on the substrate 102 using a metal material, such as Cr or Cr alloy, Al or Al alloy, Mo or Mo alloy, Ag or Ag alloy, Cu or Cu alloy, Ti or Ti alloy, and Ta or Ta alloy. A sputtering method can be used. The thickness of the gate metal layer can range from about 1,000 Å to about 5,000 Å, but it is not limited thereto. A photolithographic etching process using a first photomask is performed on the gate metal layer to form the gate electrode 104a and the gate line 104e. The first photomask is also used to form the common electrode 104b and the common electrode line 104c.

The following is a detailed description of the second photomask process with reference to FIG. 3B. Referring to FIG. 3B, the gate insulating layer 110, a silicon layer 115, and an etch stop layer 120 are formed on the substrate 102 on which the gate electrode 104a and the gate line 104e are formed. The gate insulating layer 110, the silicon layer 115, and the etch stop layer 120 may be sequentially formed using the same chemical vapor deposition (CVD) device. The gate insulating layer 110 can include one of SiNx and SiOx, the silicon layer 115 amorphous silicon, and the etch stop layer 120 one of SiNx and SiOx. The thicknesses of the gate insulating layer 110, the silicon layer 115, and the etch stop layer 120 may range from 2,000 Å to 5,000 Å, 200 Å to 2,000 Å, and 200 Å to 2,000 Å, respectively, but they are not limited thereto.

A photoresist layer is formed on the substrate 102 on which the gate insulating layer 110, the silicon layer 115, and the etch stop layer 120 are formed. Then, the photoresist layer is exposed and developed using a partial exposure mask to form a first photoresist pattern 122 having a different thicknesses over the gate electrode 104a. The partial exposure mask may be a slit mask or a diffraction exposure mask or a transflective mask.

As shown in FIG. 3C, the silicon layer 115 and the etch stop layer 120 are etched using the first photoresist pattern 122 to form the active layer 115a, silicon patterns 115c and 115e, an etch stopper intermediate pattern 120a, and etch stopper residual patterns 120c and 120e and to expose a portion of the gate insulating layer 110. A dry etching method can be used to etch the silicon layer 115 and the etch stop layer 120. The silicon patterns 115c and 115e are the second and fourth silicon patterns described in FIG. 1.

As shown in FIG. 3D, a portion of the first photoresist pattern 122 is removed to form second photoresist patterns 122a. An ashing method or the dry etching method can be used.

As shown in FIG. 3E, the etch stopper intermediate pattern 120a and an exposed portion of the gate insulating layer 110 are etched using the second photoresist pattern 122a to form the etch stopper 120aa, the contact hole 125 and the gate insulating patterns. The dry etching method may be used. The gate insulating layer 110 remains under the active layer 115a and under portions of the silicon patterns 115c and 115e. Further, a portion of the gate line 104e is exposed due to the formation of the contact hole 125. The etch stopper residual pattern 120c may be removed, and the surface of the active layer 115a and the surfaces of the silicon patterns 115c and 115e may be exposed. Then, the second photoresist pattern 122a is removed using a stripper.

The following is a detailed description of the third photomask process with reference to FIG. 3F. After an ohmic contact layer is stacked on the substrate 102 on which the gate insulating layer 110, the active layer 115a, the silicon patterns 115c and 115e, the etch stopper 120aa, the etch stop residual pattern 120e, and the contact hole 125 are formed, a multi-layered data metal layer including a first metal layer and a second metal layer is formed. The ohmic contact layer, the first metal layer, and the second metal layer may be formed using a CVD method and/or a sputtering method.

A photolithographic etching process is performed on the ohmic contact layer and the multi-layered data metal layer to form the ohmic contact pattern 128, the data line 135a (comprising the first and second metal patterns 131a and 132a), the source electrode 135b, the drain electrode 135c, the pixel electrode 131b (comprising the first metal layer), the data pad electrode 131d, and the gate pad electrode 131e. The dry etching method, or a wet etching method, or a combination method of the above two etching methods may be used. The etch stopper 120aa protects the active layer 115a from the dry etching or chemical etching, thereby protecting the electrical characteristics of the thin film transistor.

The ohmic contact patterns 128 are spaced from each other with the etch stopper 120aa therebetween. The ohmic contact patterns 128 are electrically connected to a portion of the active layer 115a. The ohmic contact patterns 128 can be one of heavily doped n+ type amorphous silicon, Mo, MoW, Cr, and Ta. The first and second metal patterns 131a and 132a can be one of Cr or Cr alloy, Al or Al alloy, Mo or Mo alloy, Ag or Ag alloy, Cu or Cu alloy, Ti or Ti alloy, and Ta or Ta alloy. The thicknesses of the ohmic contact pattern 128, the first metal pattern 131a, and the second metal pattern 132a may range from 50 Å to 500 Å, 300 Å to 1,500 Å, and 1,000 Å to 3,000 Å, respectively, but they are limited thereto.

The second metal pattern 132a may remain on the pixel electrode 131b, the gate pad electrode 131e, and the data pad electrode 131d. The pixel electrode 131b and the first metal pattern 131a of the drain electrode 135c may be integrally formed and a portion of the second metal pattern 132a remaining on the pixel electrode 131b and the second metal pattern 132a of the drain electrode 135c may be integrally formed. Although not shown, the common pad electrode 144 (refer to FIG. 1) can be additionally formed by the third photomask process.

The following is a detailed description of the fourth photomask process with reference to FIG. 3G. A passivation layer is formed on a resultant structure of the substrate 102 using the CVD method. A photoresist pattern (not shown) is formed over an area, including the source electrode 135b and the drain electrode 135c. The photolithographic etching process is performed on the second metal pattern 132b remaining on the pixel electrode 131b, the gate pad electrode 131e, and the data pad electrode 131d and the passivation layer using the photoresist pattern. Accordingly, a passivation pattern 140 remains on an area including the source electrode 135b and the drain electrode 135c, and the passivation layer and the second metal pattern 132b are removed from the surface of each of the pixel electrode 131b, the gate pad electrode 131e, and the data pad electrode 131d, thereby exposing the pixel electrode 131b, the gate pad electrode 131e, and the data pad electrode 131d. Therefore, the second metal pattern 132a of the drain electrode is separated.

The passivation pattern 140 can be SiOx or SiNx. The thickness of the passivation pattern 140 may range from about 1,000 Å to about 5,000 Å, but it is not limited thereto. The dry etching method, or the wet etching method, or a combination method of the above two etching methods may be used.

As described above, the thin film transistor substrate according to the first embodiment is manufactured through a 4-photomask process. Accordingly, the manufacturing cost and time are reduced. In the thin film transistor substrate according to the first embodiment, the etch stopper is formed on the active layer during a 4-photomask process. Accordingly, over-etching of the active layer is prevented, thereby protecting the electrical characteristics of the thin film transistor. Since the active layer and the data line are patterned using different masks in the thin film transistor substrate according to the first embodiment using the 4-photomask process, a wavy noise is reduced such that the quality of the screen of the flat panel display improves.

Figure 4:
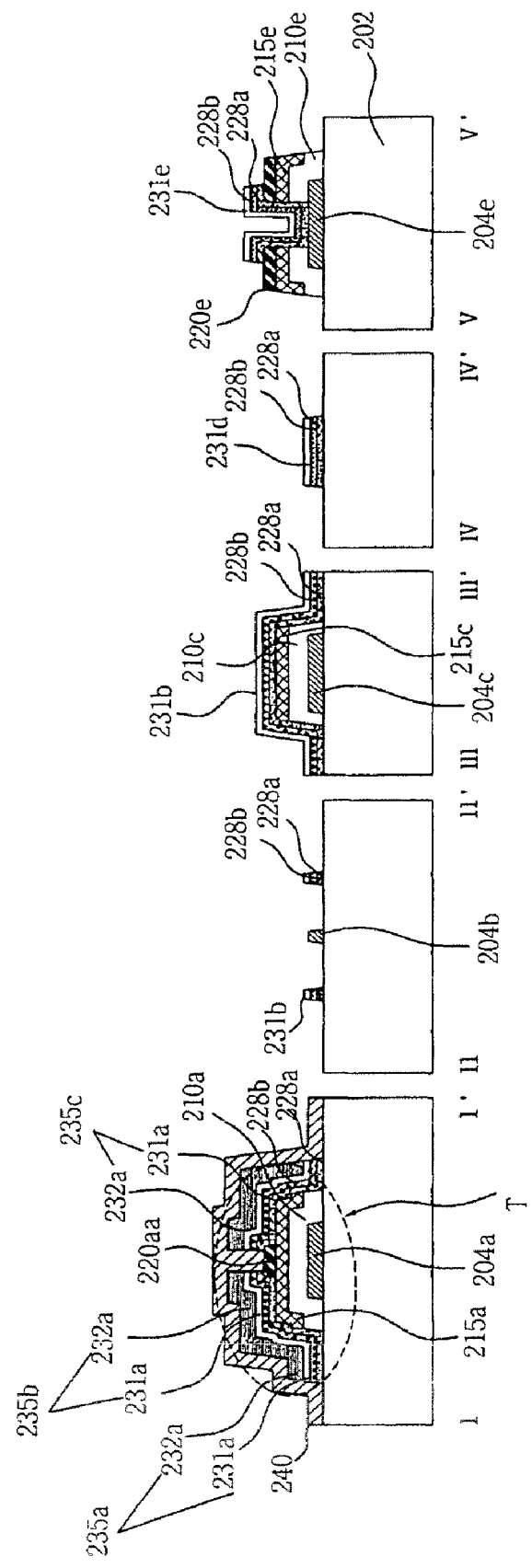
FIG. 4 is a cross-sectional view of a thin film transistor substrate according to a second embodiment.

FIG. 4 is a cross-sectional view of a thin film transistor substrate according to a second embodiment. Referring to FIG. 4, the thin film transistor substrate according to the second embodiment includes a gate electrode 204a positioned on a substrate 202. The gate electrode 204a is formed through a first photomask process. A common electrode 204b, a common electrode line 204c, and a gate line 204e can also be formed through the first photomask process.

A gate insulating layer 210 is positioned on the gate electrode 204a, and an active layer 215a and an etch stopper 220aa are positioned on the gate insulator 210. The etch stopper 220aa prevents a damage to the active layer 215a in subsequent processes for forming a data line 235a, a source electrode 235b, and a drain electrode 235c.

The data line 235a, the source electrode 235b, and the drain electrode 235c are positioned on the etch stopper 220aa. The data line 235a includes first and second ohmic contact patterns 228a and 228b, and first and second metal patterns 231a and 232a. The first ohmic contact patterns 228a can include one of heavily doped n+ type amorphous silicon, Mo, MoW, Cr, and Ta. The first metal pattern 231a is a transparent conductive material, such as ITO and IZO.

The second ohmic contact patterns 228b improves ohmic contact characteristics of an interface between the first ohmic contact pattern 228a and the first metal pattern 231a. Therefore, the second ohmic contact pattern 228b can include one of Mo, MoW, Cr, and Ta having good ohmic contact characteristics with respect to both the first ohmic contact pattern 228a and the first metal pattern 231a. Since Mo, MoW, Cr, and Ta are an opaque metal, they can be formed thin.

The second metal pattern 232a includes one of Cr or Cr alloy, Al or Al alloy, Mo or Mo alloy, Ag or Ag alloy, Cu or Cu alloy, Ti or Ti alloy, and Ta or Ta alloy.

The thicknesses of the first and second ohmic contact patterns 228a and 228b, and the first and second metal patterns 231a and 232a may range from 50 Å to 500 Å, 50 Å to 100 Å, 300 Å to 1,500 Å, and 1,000 Å to 3,000 v, respectively, but they is not limited thereto.

A pixel electrode 231b, a data pad electrode 231d, and a gate pad electrode 231e are positioned over the substrate 102. The first and second ohmic contact patterns 228a are 228b may be positioned on lower portions of the pixel electrode 231b, the data pad electrode 231d, and the gate pad electrode 231e. Silicon patterns 215c and 215e including the same material as the active layer 215a can be positioned at crossing portions of the pixel electrode 231b and the common electrode line 204c, and the gate pad electrode 231e.

A passivation pattern 240 is positioned over a thin film transistor (T) including the gate electrode 204a, the active layer 215a, the first and second ohmic contact layers 228a and 228b, the source electrode 235b, and the drain electrode 235c.

In the thin film transistor substrate according to the second embodiment, the etch stopper is formed on the active layer during a 4-photomask process. Accordingly, the manufacturing cost and time are reduced while damage to the active layer is prevented, thereby maintaining electrical characteristics of the thin film transistor. In the thin film transistor substrate according to the second embodiment using a 4-photomask process, the source electrode and the drain electrode are formed using the first metal layer of a transparent conductive layer and the second metal layer of an opaque conductive layer and the pixel electrode is formed using a transparent electrode. Accordingly, an aperture ratio of the thin film transistor substrate according to the second embodiment improves. Since the second ohmic contact pattern with the good ohmic contact characteristics is formed between the first metal layer of the transparent conductive layer and the first ohmic contact pattern, a contact resistance between the first metal layer and the first ohmic contact pattern is reduced.

Although, an in-plane switching (IPS) mode liquid crystal display was described in the first and second embodiments, the method of manufacturing of the present invention may be applied to a fringe-field switching (FFS) mode liquid crystal display. In other words, in a case of the FFS mode liquid crystal display, an ITO layer for a common electrode and a gate metal layer are stacked and then patterned to form the common electrode and a gate electrode. A gate insulating layer is formed on the common electrode, and a pixel electrode is then formed to correspond to the gate insulating layer.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A method of fabricating a liquid crystal display device, the method comprising:
    forming a gate electrode on a substrate;
    forming a gate insulator on the gate electrode, an active layer on the gate insulator, and an etch stopper on the active layer;
    depositing an ohmic contact layer, a first metal layer and a second metal layer on the substrate;
    etching the ohmic contact layer, and the first and second metal layers to form ohmic contact patterns, and first and second metal patterns including source, drain and pixel electrodes using a single photomask;
    stacking a passivation layer directly contacted with the substrate, the source electrode, the drain electrode, and the etch stopper on the substrate including the source electrode and the drain electrode.

2. The method of claim 1, wherein the forming of the gate electrode includes forming a common electrode, a common electrode line, and a gate line.

3. The method of claim 1, wherein the etching includes forming a data line.

4. The method of claim 1, wherein the single photomask is one of a slit mask, a diffraction exposure mask and a transflective mask.

5. The method of claim 1, wherein the forming of the gate insulator, the active layer, and the etch stopper includes:
    forming a photoresist layer on the etch stopper;
    exposing the photoresist layer using a partial exposure mask;
    developing the photoresist layer to form a first photoresist pattern having a different thickness at each location;
    etching the active layer and the etch stopper to form the active pattern and an etch stop intermediate pattern using the first photoresist pattern;
    removing a portion of the first photoresist pattern to form a second photoresist pattern; and
    etching the etch stop intermediate pattern to form the etch stopper using the second photoresist pattern.

6. The method of claim 1, wherein the etch stopper includes one of silicon nitride and silicon oxide.

7. The method of claim 1, wherein the etching of the ohmic contact layer, the first metal layer, and the second metal layer includes forming a data line having the same stack structure as the source and drain electrodes.

8. The method of claim 7, wherein the etching of the ohmic contact layer, the first metal layer, and the second metal layer further includes forming a gate pad electrode and a data pad electrode electrically connected to the gate line and the data line, respectively.

9. The method of claim 8, wherein the forming of the gate insulating layer, the active layer, and the etch stopper includes forming a contact hole exposing a portion of the gate line to electrically connect the gate pad electrode to the gate line.

10. The method of claim 1, further comprising etching the passivation layer to form a passivation pattern covering the source electrode and the drain electrode and removing the second metal pattern on the pixel electrode.

11. The method of claim 3, wherein the pixel electrode is integrally formed with and extends from the first metal pattern of the drain electrode.

* * * * *